(12) United States Patent
Shieh

(10) Patent No.: US 8,826,659 B2
(45) Date of Patent: Sep. 9, 2014

(54) EJECTOR WITH CHECK VALVE

(75) Inventor: Tenghua Tom Shieh, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 126 days.

(21) Appl. No.: 13/245,916

(22) Filed: Sep. 27, 2011

(65) Prior Publication Data

US 2013/0074493 A1   Mar. 28, 2013

(51) Int. Cl.
  *F02B 33/44*   (2006.01)
  *F04F 5/48*    (2006.01)
  *G05D 11/00*   (2006.01)
  *B01F 5/04*    (2006.01)

(52) U.S. Cl.
  USPC .............. 60/605.1; 60/611; 137/98; 137/100; 137/895; 417/183; 417/184

(58) Field of Classification Search
  CPC ....... F01N 13/1811; F02B 37/02; F02B 37/18
  USPC ........... 60/605.1, 611; 137/98, 100, 893, 895; 417/184, 183, 180, 186
  See application file for complete search history.

(56) References Cited

U.S. PATENT DOCUMENTS

| | | | | |
|---|---|---|---|---|
| 2,248,679 | A | * | 7/1941 | Guthmann ..................... 417/180 |
| 3,263,702 | A | * | 8/1966 | Pullen et al. ............. 137/625.64 |
| 4,424,676 | A | * | 1/1984 | Meiners ....................... 60/605.1 |
| 4,557,226 | A | | 12/1985 | Mayer et al. |
| 5,587,072 | A | * | 12/1996 | Regan ........................... 210/232 |
| 2002/0046743 | A1 | | 4/2002 | Moren |
| 2006/0260682 | A1 | * | 11/2006 | Yang .............................. 137/100 |
| 2008/0066466 | A1 | * | 3/2008 | Melchior ........................ 60/600 |
| 2010/0037870 | A1 | | 2/2010 | Elz et al. |
| 2011/0073082 | A1 | | 3/2011 | Hattori et al. |

* cited by examiner

*Primary Examiner* — Kenneth Bomberg
*Assistant Examiner* — Deming Wan
(74) *Attorney, Agent, or Firm* — Gifford, Krass, Sprinkle, Anderson & Citkowski, P.C.

(57) ABSTRACT

PCV systems are well known in the art and commonly used in turbocharged engines. The ejector creates a pressure drop for additional pull of PCV gas under boosted conditions of the turbocharger engine. The ejector typically includes a first inlet and a second inlet and a sole outlet. The first inlet pulls air from the compressor of the PCV system. The second inlet pulls air from the cyclone separator of the PCV system. Air exiting the ejector is exited to the intake manifold. However, when the turbocharger of the system is off, fresh air can leak in from the inlet from the oil separator thereby preventing the ventilation of blowby. The unwanted air reduces the efficiency of the turbocharger system. Accordingly, an ejector preventing unwanted fresh air flow is needed in the art.

12 Claims, 3 Drawing Sheets

EJECTOR WITH CHECK VALVE

FIELD OF THE INVENTION

This invention relates generally to check valves, more particularly, the invention related specifically to a blowby gas refluxing device provided in a turbocharger engine system.

BACKGROUND OF THE INVENTION

PCV systems are well known in the art and commonly used in turbocharged engines. PCV systems commonly include an ejector used to extract air from the oil separator of the PCV system for blowby flow ventilation and droplet capturing in the oil separator. The ejector creates a pressure drop for additional pull of PCV gas under boosted conditions of the turbocharger engine. The ejector typically includes a first inlet and a second inlet and a sole outlet. The first inlet pulls air from the compressor of the PCV system. The second inlet pulls air from the oil separator of the PCV system. Air exiting the ejector is exited to the intake manifold. However, when the turbocharger of the system is off, fresh air can leak in from the inlet from the oil separator thereby preventing the ventilation of blowby. The unwanted air reduces the efficiency of the PCV system for ventilation and oil recycling in turbocharger engine. Accordingly, an ejector preventing unwanted fresh air flow is needed in the art.

SUMMARY OF THE INVENTION

The present invention includes a check valve for use in a turbocharger engine, the check valve comprising an ejector having a first inlet receiving air from a compressor, the second inlet receiving air from an oil separator, and an outlet rejecting air to the manifold. The check valve further including a subassembly moveable within the ejector having a spool, a nozzle, and a spring wherein the spool includes an outer edge wherein the outer edge is cylindrical in shape and dimension allowing for the outer edge of the spool to be larger than the first inlet thereby covering the first inlet. A first position defined when the outer edge of the spool rests adjacent the first inlet and fully covers the first inlet so that fresh air would not enter to oil separator to block ventilation. A further second position defined when the outer edge of the spool is positioned away from the first inlet allowing pulling PCV gas through first inlet through oil separator. The subassembly contained within the ejector connected to the ejector by means of a spring wherein the spring is operable to return the subassembly to a resting position when not in use. The check valve assembly further including a base plate connected to the spring wherein the base plate is mounted to the vehicle so as to firmly secure the check valve assembly to the vehicle. The spool further including a plurality of laterally extended apertures to facilitate fluid flow, the apertures extending fully through the spool allowing fluid to flow through the apertures.

DETAILED DESCRIPTION OF THE DRAWINGS

Figure 1:
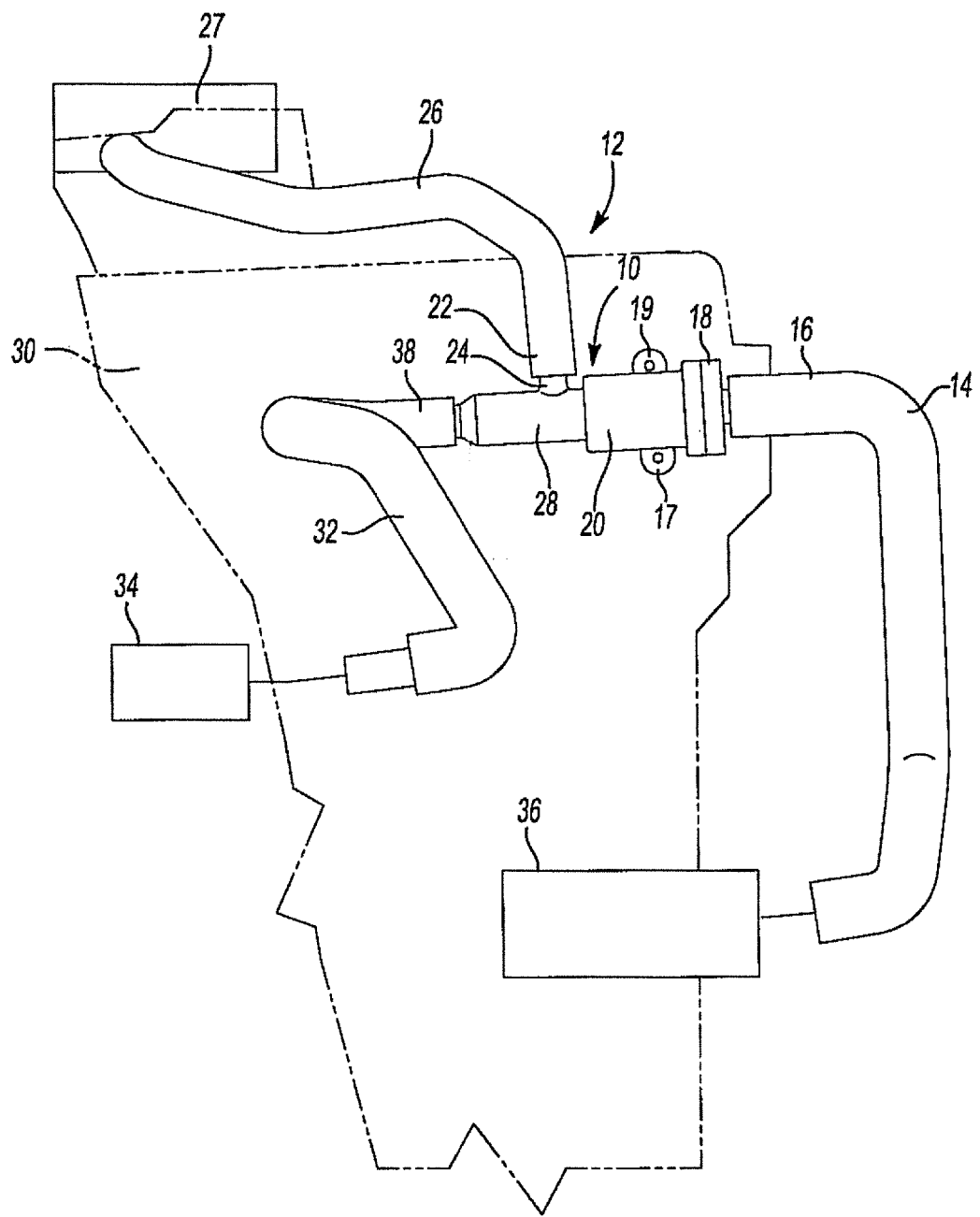
FIG. 1 is an environmental view of the ejector as shown within the PCV system.

The purpose of this invention is to provide a combined function check valve for air extraction during engine turbocharger operation and to allow for a check valve having a closed passage when the turbocharger is off. The present invention provides a check valve having the structure of an ejector to close the first inlet passage when the turbocharger is off. The closure of the first inlet to the oil separator allows the oil separator to function properly without unwanted fresh air. The valve includes a nozzle and moveable spool to control the opening and closing of the first inlet to the oil separator of the PCV system. The valve further includes a spring to return the spool to the resting position.

The Figures illustrate the check valve (or ejector) 10 and subassembly 11 installed within the PCV system 12. Generally, the check valve 10 receives compressed air through a conduit 14 and through the first opening 16 of the conduit 14 receiving air from the compressor. Air continues through the check valve 10. Air travels from the oil separator through the inlet 24 through the first end 22 of the inlet 24 through the valve 10. Furthermore, air travels through the valve 10 to a second inlet to the first opening 38 of the manifold 32. The valve 10 is attached to the vehicle system 30 by means of a bracket 19 and possibly a plurality of screws or other bolts. The bracket 19 further includes adjacent bracket 17 to better secure the valve 10 to the vehicle system 30. The PCV system 12 and corresponding vehicle system 30 work in cohesion to operate a turbocharger engine.

Figures 2, 3:
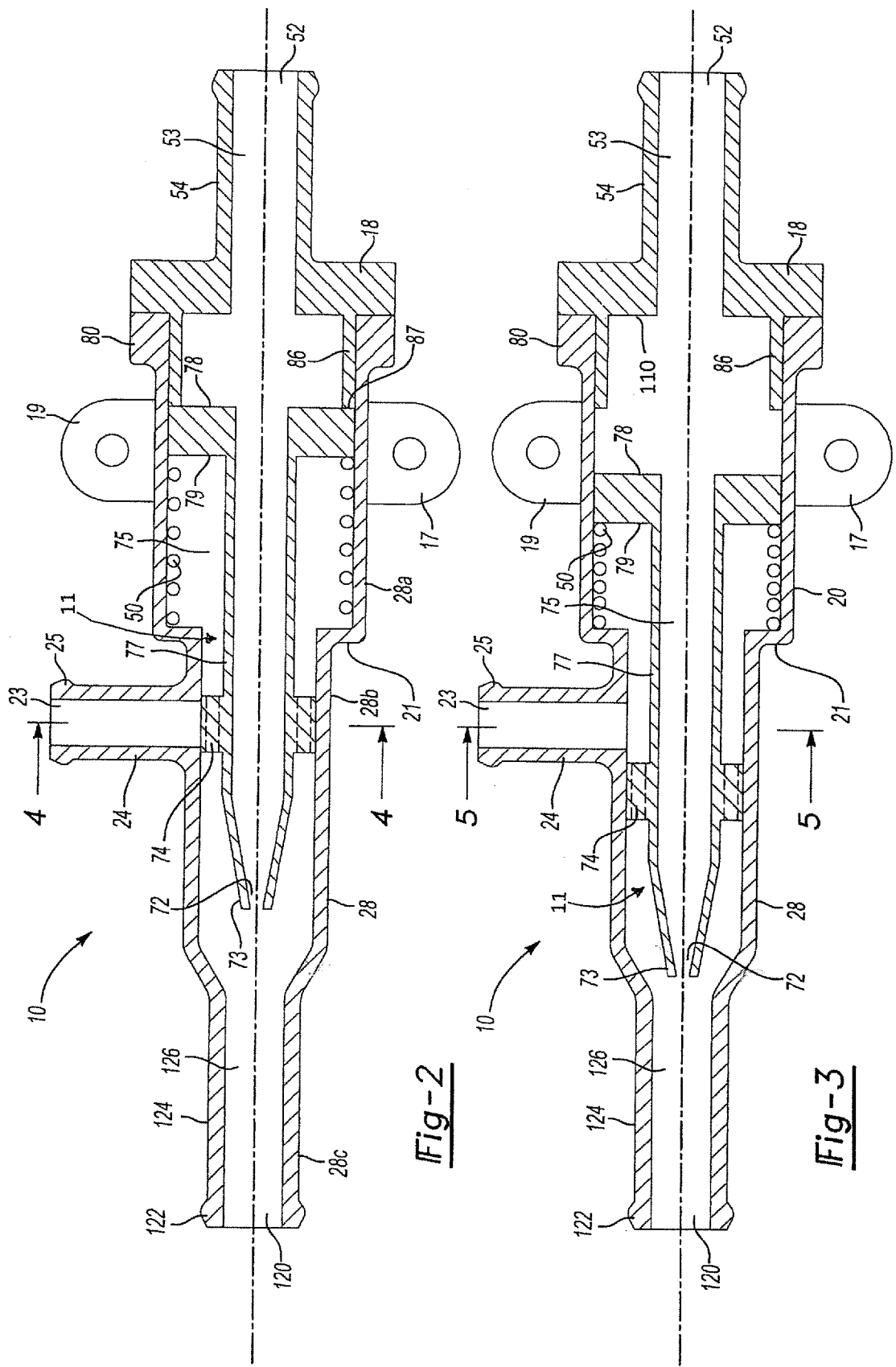
FIG. 2 is a cross-sectional view of the ejector in the closed position.
FIG. 3 is a cross-sectional view of the ejector as shown in the open position.

FIGS. 2 and 3 show the check valve 10 in both the closed (FIG. 2) and open (FIG. 3) positions. The closed position as shown in FIG. 2 is the relaxed position. As described in the direction of air flow, the valve 10 includes a first inlet 52 having a passageway 53 allowing air from the compressor to travel into the valve 10. The first inlet 52 includes an elongated cylindrical member 54 allowing air to travel within (through the passageway 53). A base plate 18 is provided connected to and adjacent the elongated tube 54.

Adjacent the base plate 18 is provided a stopper 86 and outer casing 80. A spool 78, when in the rested position as shown in FIG. 2, rests adjacent to the stopper 86. The spool 78, when in the rested position, directly abuts a planar surface 87 on the stopper 86. Further, a spring 50 allows the stopper (or second spool) 78 to return to its resting position as shown in FIG. 2. The spring 50 places a force on the second spool 78 to force the second spool 78 to its resting position. The spool 78 is solid and generally cylindrical in shape. The spool 78 further includes a planar surface 79 which is parallel in relation to the base plate 18. The valve 10 then further includes a nozzle 73 and a elongated cylindrical nozzle body 77. Air travels through the passageway 75 of the nozzle body 77 to the nozzle 73 having an opening 72. The nozzle 73 is tapered providing for the compressed air to undergo a pressure change as it travels through the passage 75.

A spool 74 is provided on the nozzle body 77. The spool 74 is generally cylindrical in shape having two planar surfaces generally parallel to the first spool 78 in the base plate 18. The working spool 74 actively prevents air from flowing in or out of a first passage 23. The first passage 23 allows air to flow through to the oil separator 27. The passageway 23 includes an elongated cylindrical passageway 24 having a first end 25 having structure 25 allowing connection to various conduits 26 to the oil separator 27.

As shown in FIG. 2, the spool 74 (also referred to as the first spool) is entirely blocking the passage 23 to the oil separator 27. The resting position as shown in FIG. 2 occurs when the turbocharger is off and no air is received from the oil separator 27. The blockage of the passage 23 by the spool 74 increases the efficiency of the turbocharger system by preventing any fresh air from entering the oil separator 27. During the resting position, minimal air is flowing in through the inlet 52 from the compressor 36. Little to no pressure on the spool 78 and thereby on the spool 74 allows the spring 50 to remain resting and fully cover the passage 23 by the spool 74.

The valve 10 further includes the main valve body 28. The main valve body 28 is generally tapered at various points to allow for pressure changes of the air flowing through the valve 10. The body 28a is larger than the body 28b which is subsequently larger than the body 28c. The tapering of the body 28 is either drastic as shown at right angle 21 or gradual and tapered as shown at diameter change point 72. The body 28 tapers at point 72 to the passageway 126 exiting the compressed air to the manifold. The passageway 126 includes a cylindrical passageway body 124 having an exit 120. The exit 120 includes structure 122 to allow proper connection to the first end 38 of the manifold 32. The manifold 32 further exits to a subsequent vehicle subsystem 34.

The valve 10 as depicted in FIG. 3 shows the valve 10 in the open position. Compressed air moving through the inlet 52 and through the passageway 53 forces the first spool 78 thereby forcing the spring 50 to move the nozzle 73 in a forward direction thereby moving the spool 74 away from the passageway 23. Air from the oil separator 27 is then allowed to flow through the passageway 23 to the manifold 32 through the passageway 23 and subsequently through the passageway 126. The open position of the spool 74 as depicted in FIG. 3 occurs when the turbocharger is on. Air is able to pass from and through the passageway 23 between the manifold 32 and the oil separator 27.

When the turbocharger is off, the spring 50 is allowed to rest and forces the spool 78 and subsequently the spool 74 to the resting position as shown in FIG. 2. The spool thereby blocks the passageway 23 thereby preventing any fresh air from entering the oil separator 27. The spring constant of the spring 50 is calculated for the range of the compressor 36 during operating conditions.

Figure 4:
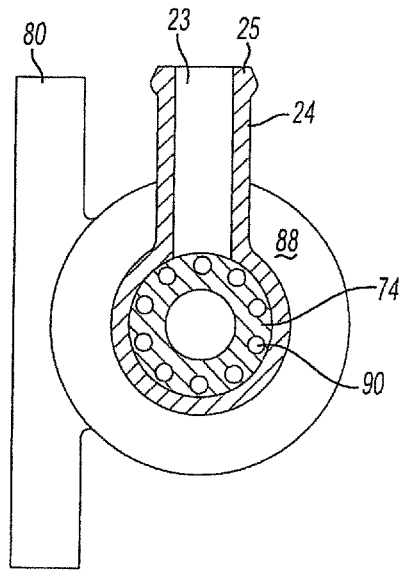
FIG. 4 is a cross-sectional view along the line 4-4 as shown in FIG. 2.
Figure 5:
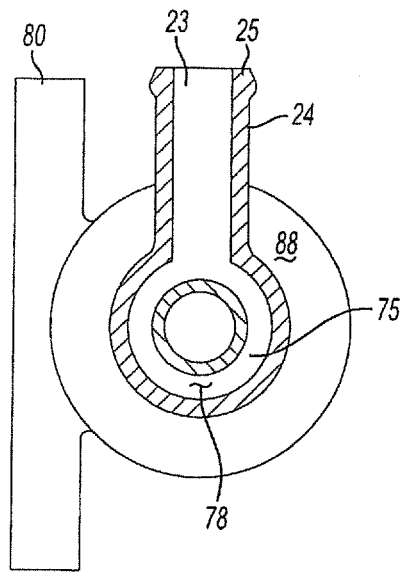
FIG. 5 is a cross-sectional view along the line 5-5 as shown in FIG. 3.

The figures as shown in FIGS. 4 and 5 show the cross sections of the passage 23 in both the closed (FIG. 4) and the open position (FIG. 5). As shown by the closed position as depicted in FIG. 4, the spool 74 includes a plurality of apertures 90 to allow for increased ventilation through the spool 74 while still maintaining a blocked passage 23. The apertures 90 extend through the length of the spool 74 in a lateral direction and are sufficiently large to allow for substantial air flow through the spool 74.

As shown in FIG. 5, the passageway 75 of the nozzle body 77 is completely unblocked and allowing air to travel through the passage 23. Air can flow down through the passage 23 or up through the passage 23 during the open position. The open position as shown in FIG. 5 is the position for which is used when the turbocharger system is in the on position.

Figure 6:
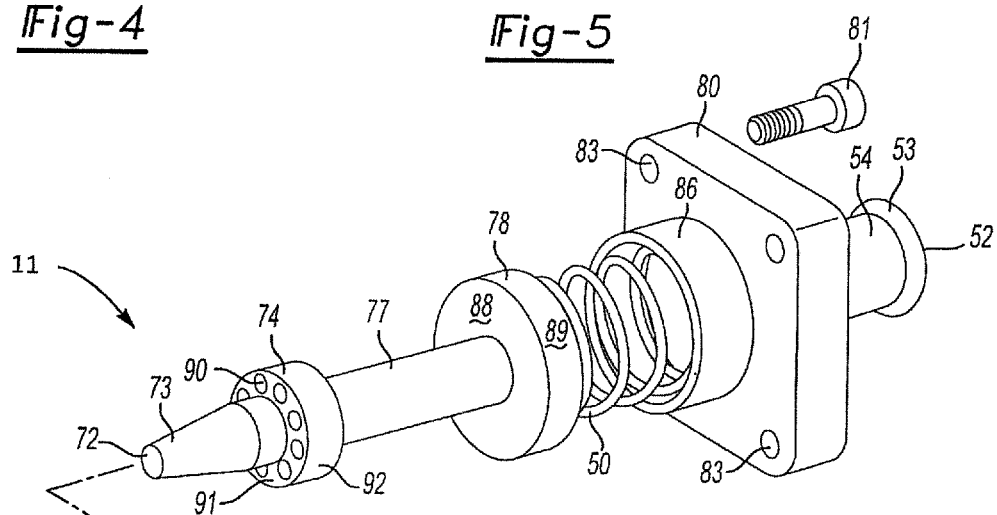
FIG. 6 is an exploded perspective view of the check valve assembly.
Figure 6:
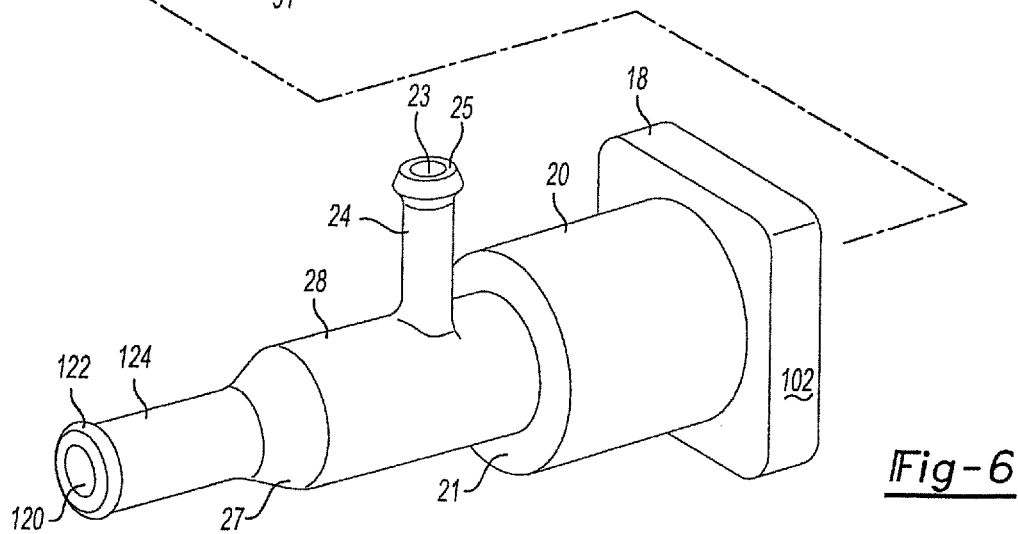

The exploded perspective view of the valve 10 as shown in FIG. 6 illustrates all of the essential parts to the valve 10 within the PCV system 12. The valve 10 is shown including the base plate 18 having a side planar surface 102 and an upper planar surface 110. A largest portion body 20 of the overall valve is shown connected to the middle body 28 further connected to the smallest body 124. The largest body 20 is connected to the middle body 28 by means of a transition point 21. Furthermore, the middle body 28 is connected to the small body 124 by means of a tapered portion 72. The valve 10 further includes an outer elongated cylindrical member 24 containing the passage 23.

The member 24 further includes connection structure 25 allowing proper conduit to connect to the member 24. The smallest body 124 includes the passage or exit 120. The smallest body 124 further includes structure 122 allowing for connection of the proper conduit. A nozzle 73 is placed within the main valve body 28 as shown by the line 110. The nozzle 73 further includes the opening 72. A nozzle body 77 is provided having the spool 74 including the first surface 92 and a planar surface 91 including a plurality of apertures 90. The first spool 74 and the second spool 78 are separated by the nozzle body 77. The spool 78 includes a first planar surface 88 and an outer surface 89. A stopper 86 is provided connected to a base plate 18. The spring 50 separates the spool 78 and the stopper 86. The base plate 18 includes apertures 83 adapted to accept the bolt 81 to secure the valve system, when fully assembled, to the vehicle system. The first inlet 52 includes the elongated body 54 having connection structure 53.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient roadmap for implementing an exemplary embodiment, it being understood that various changes may be in the function and arrangement of elements described in the exemplary embodiment without departing from the scope as set forth in the appended claims and their legal equivalents.

I claim:

1. A check valve for use in a turbocharger, the valve comprising:
   an ejector having an inlet for receiving air from a compressor, a passageway for receiving air from an oil separator and an outlet for ejecting air, the passageway fluidly connected to the outlet;
   a subassembly movable within the ejector having a first spool, a second spool, a nozzle and a spring, the first spool having an outer edge, the spring positioned between the first spool and the second spool;
   a first position defined when the spring biases the first spool and second spool to a closed position where the outer edge of the first spool rests adjacent the passageway and fully covers the passageway;
   a second position defined when the outer edge of the first spool is positioned away from the passageway to allow air to flow into the passageway, the second position further defined where the subassembly is moved from a rearward to a forward position to compress the spring, the outer edge moved to the second position by means of air pressure received from the compressor.

2. The check valve as claimed in claim 1 wherein the ejector is tapered from a first end to a second end to control fluid flow.

3. The check valve as claimed in claim 2 wherein the first end is larger in diameter than the second end.

4. The check valve as claimed in claim 1 wherein the first spool having the outer edge is cylindrical in shape and dimension allowing for the outer edge of the first spool larger than the passageway.

5. The check valve as claimed in claim 1 wherein the second spool is connected and separated apart from the first spool, the first spool and the second spool separated by an elongated cylinder.

6. The check valve as claimed in claim 5 wherein the second spool is solid having a first planar surface and a second planar surface.

7. The check valve as claimed in claim 6 wherein the first planar surface is separated from and parallel to a planar surface on a base plate.

8. The check valve as claimed in claim 1 wherein the spool includes a plurality of laterally extending apertures to facilitate fluid flow, the apertures extending fully through the spool.

9. The check valve as claimed in claim 1 wherein the passageway has an extended inlet tube extending generally perpendicularly away from the check valve.

10. The check valve as claimed in claim 9 wherein the extended inlet tube includes a receiving portion.

11. The check valve as claimed in claim 1 wherein the inlet is larger in diameter as compared to the passageway.

12. An assembly comprising:
a turbocharger engine;
a turbocharger ejector having an inlet for receiving air from a compressor of the turbocharger engine, a passageway for receiving air from an oil separator and an outlet for ejecting air;
a subassembly movable within the turbocharger ejector having a first spool, a second spool, a nozzle body and a spring, the first spool having an outer edge, the spring positioned between the first spool and the second spool, the nozzle body having a smaller diameter than the first spool, the spring positioned around the outside of the nozzle body;
a first position defined when the outer edge of the spool rests adjacent the passageway and fully covers the passage, the first position further defined when the spring biases the first spool and the second spool;
a second position defined when the outer edge of the spool is positioned away from the passageway, the second position further defined where the subassembly is moved from a rearward to a forward position to compress the spring, the outer edge moved to the second position by means of air pressure received from the compressor.

* * * * *